United States Patent
Qiu et al.

(10) Patent No.: US 9,441,969 B2
(45) Date of Patent: Sep. 13, 2016

(54) RESONANT FIBER OPTIC GYROSCOPES WITH MULTI-CORE TRANSPORT FIBER

(71) Applicant: Honeywell International Inc., Morristown, NJ (US)

(72) Inventors: Tiequn Qiu, Glendale, AZ (US); Glen A. Sanders, Scottsdale, AZ (US); Lee K. Strandjord, Tonka Bay, MN (US)

(73) Assignee: Honeywell International Inc., Morris Plains, NJ (US)

( * ) Notice: Subject to any disclaimer, the term of this patent is extended or adjusted under 35 U.S.C. 154(b) by 381 days.

(21) Appl. No.: 14/094,105

(22) Filed: Dec. 2, 2013

(65) Prior Publication Data

US 2015/0285635 A1  Oct. 8, 2015

(51) Int. Cl.
*G01C 19/72* (2006.01)
*G02B 6/02* (2006.01)
*G02B 6/26* (2006.01)

(52) U.S. Cl.
CPC .......... *G01C 19/721* (2013.01); *G01C 19/727* (2013.01); *G02B 6/02042* (2013.01); *G02B 6/262* (2013.01)

(58) Field of Classification Search
CPC .............. G01C 19/721; G01C 19/727; G02B 6/02042; G02B 6/262
See application file for complete search history.

(56) References Cited

U.S. PATENT DOCUMENTS

| | | |
|---|---|---|
| 4,354,760 A | 10/1982 | Schiffner |
| 4,443,698 A | 4/1984 | Schiffner |
| 5,111,525 A | 5/1992 | Hartouni |
| 5,331,404 A | 7/1994 | Moeller et al. |
| 5,452,394 A * | 9/1995 | Huang ............... G02B 6/105 385/11 |
| 5,455,698 A * | 10/1995 | Udd ............... H04B 10/85 398/1 |
| 5,563,967 A | 10/1996 | Haake |
| 8,497,994 B2 | 7/2013 | Bergh |
| 2010/0039649 A1* | 2/2010 | Digonnet ........... G01C 19/721 356/460 |
| 2012/0163801 A1 | 6/2012 | Takenaga et al. |
| 2013/0077967 A1 | 3/2013 | Woodward et al. |
| 2013/0188949 A1 | 7/2013 | Fini et al. |

FOREIGN PATENT DOCUMENTS

| | | |
|---|---|---|
| EP | 2251642 | 11/2010 |
| EP | 2333483 | 6/2011 |
| WO | 2008003071 | 1/2008 |

OTHER PUBLICATIONS

European Patent Office, "Extended European Search Report from EP Application No. 14192143.7 mailed May 12, 2015", "from Foreign Counterpart of U.S. Appl. No. 14/094,105", May 12, 2015, pp. 1-5, Published in: EP.

\* cited by examiner

*Primary Examiner* — Hwa Lee
(74) *Attorney, Agent, or Firm* — Fogg & Powers LLC

(57) ABSTRACT

A multi-core transport system for a resonant fiber optic gyroscope is provided. The transport system has a transport fiber configured to transmit a clockwise signal and a counterclockwise signal, wherein the transport fiber has at least a first core and a second core. The first core and second core are configured such that when the first core imparts a first effect on the clockwise signal, the second core imparts a second effect on the counterclockwise signal, wherein the second effect substantially mirrors the first effect. The system further comprises a first coupler configured to optically couple the clockwise signal to the first core, and the counterclockwise signal to the second core; and a second coupler configured to optically couple the clockwise signal from the first core to a resonator, and the counterclockwise signal from the second core to the resonator.

13 Claims, 5 Drawing Sheets

RESONANT FIBER OPTIC GYROSCOPES WITH MULTI-CORE TRANSPORT FIBER

BACKGROUND

Conventional resonator fiber optic gyroscopes (RFOG) require at least two light beams, one transmitted in the clockwise (CW) direction of the resonator, and the other launched in the counterclockwise (CCW) direction. Their frequencies are locked to the CW and CCW resonant frequencies, and are used to measure rotation rates. The relative (differential) frequency noise between the CW and CCW light will contribute to the overall noise in the rotation rates. Differential frequency noise can be reduced by phase locking the CW and CCW lasers using a phase-locked loop (PLL).

Although phase-locked lasers exhibit very low differential frequency noise immediately at the laser output, differences in thermal and acoustic noises experienced by the lasers in the CW and CCW optical paths to the resonator de-correlates the two beams at the input to the resonator, creating differential phase noise and causing degraded RFOG performance.

Since the noise experienced in the CW and CCW optical paths are different, common mode subtraction has a limited effect toward removal of this noise.

SUMMARY

In one embodiment, a multi-core transport system for a resonant fiber optic gyroscope is provided. The multi-core transport system comprises a transport fiber configured to transmit a clockwise signal and a counterclockwise signal. The transport fiber has at least a first core and a second core. The first core and second core are configured such that the phase relationship between the clockwise signal and counterclockwise signal is substantially maintained. Furthermore, effects of the second core on of the counterclockwise signal, such as frequency changes, acoustic disturbances and thermal noise, substantially mirrors the effect of the first core on the clockwise system. The system further comprises a first coupler configured to optically couple the clockwise signal to the first core and the counterclockwise signal to the second core, and a second coupler configured to optically couple the clockwise signal from the first core to a resonator and the counterclockwise signal from the second core to the resonator. Thus, differential noise in the output of the resonant fiber optic gyroscope can be reduced by the multi-core transport system.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
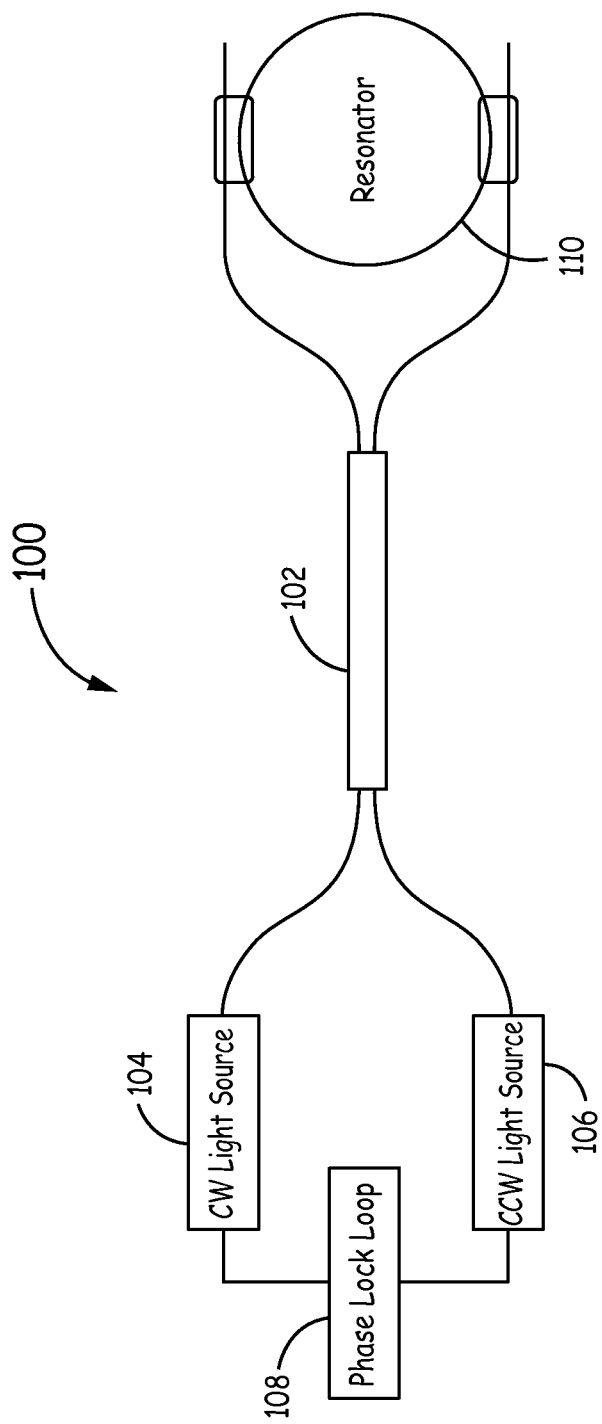
FIG. 1 illustrates an exemplary low differential noise resonant fiber optic gyroscope system using a multi-core transport fiber.

In accordance with common practice, the various described features are not drawn to scale but are drawn to emphasize specific features relevant to the exemplary embodiments.

DETAILED DESCRIPTION

By using a specialized transport fiber, it is possible to reduce differential phase noises by reducing differences in thermal and acoustic noises in the CW and CCW optical paths.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates an exemplary low differential noise RFOG system, indicated generally at 100, using a multiple-core transport fiber 102. RFOG system 100 includes multi-core transport fiber 102, a CW light source 104, a CCW light source 106, a phase lock loop 108, and a resonator 110. In one embodiment, CW light source 102 and CCW light source 104 each comprise a laser.

CW light source 104 and CCW light source 106 are coupled to phase lock loop 108. Phase lock loop 108 is a control system configured to monitor the frequency and phase of the output signal of CW light source 104, the CW signal, and CCW light source 106, the CCW signal, and adjust the CW signal and CCW signal to keep the phases of the signals matched. The phase locked outputs of CW light source 104, the CW signal, and CCW light source 106, the CCW signal, are coupled to transport fiber 102.

Transport fiber 102 has at least a first core and a second core. In one embodiment, the transport fiber 102 is a multiple-core fiber, also referred to interchangeably as a multi-core fiber, used to transport CW and CCW beams or signals from CW light source 104 and CCW light source 106 to the resonator 110. In one embodiment, the transport fiber is a multi-core fiber having only two cores. In other embodiments, the multi-core fiber can have more than two cores. In some embodiments, the cores can be hollow cores. In yet other embodiments, the transport fiber is a photonic crystal fiber, such as a photonic-bandgap fiber. The first core is coupled to the output of CW light source 104, and carries the CW signal from CW light source 104 to resonator 110. The second core is coupled to the output of CCW light source 106, and carries the CCW signal from CCW light source 106 to the resonator 110. The first and second cores are configured so that changes caused by the first core to a characteristic of the CW signal are mirrored by the second core on a corresponding characteristic of the CCW signal. Characteristics can include, but are not limited to, the phase of the signal, thermal noise, acoustic noise, or the frequency of the signal. The first core and second core are made with the same material and fabricated at the same time using the same process and parameters, so that they have almost identical properties for guiding light. This significantly reduces differential phase noises induced during light transmission from transport fiber input to output. In one embodiment, the first core and second core are positioned in close proximity to each other, on the order of a few microns to a few tens of microns, so that acoustic and thermal disturbances in the optical path of each of the first and second cores are experienced similarly by both the CW and CCW signal. Thus, differential variations in acoustic and thermal noise between the first core and second core, or disturbances that cause differential strain or differential optical pathlength changes between the two lightwaves (CW and CCW signal) are also are also reduced. The first core and second core, however, are not placed in close enough proximity to produce optical coupling between the two lightwaves; that is, there is substantially no leakage of light from one core to the other.

Figure 2:
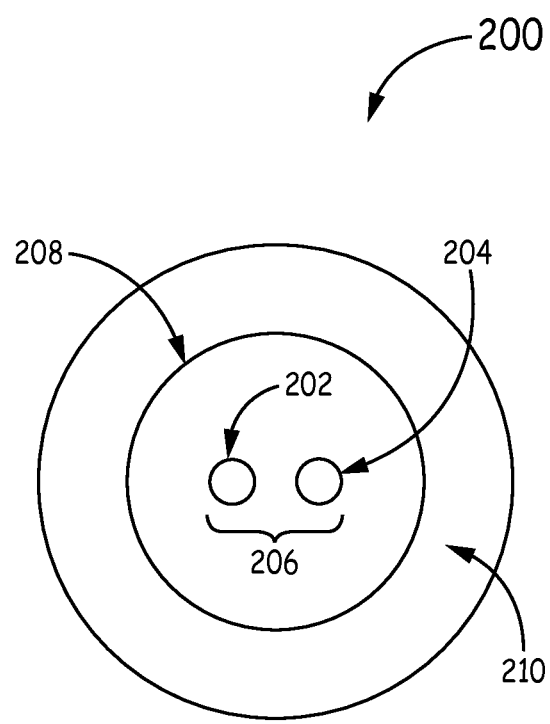
FIG. 2 is a cross sectional view of an exemplary transport fiber with two cores.

FIG. 2 illustrates a cross sectional view of an example transport fiber with two cores 200. In one embodiment of system 100 of FIG. 1, multicore fiber 102 is constructed as shown and described with respect to transport fiber 200 of FIG. 2. Transport fiber 200 comprises multiple-cores 206 having a first core 202 and second core 204. Multiple-cores 206 are surrounded by cladding 208, and jacket 210. In one embodiment, first core 202 and second core 204 are made of materials with a higher refractive index than the cladding 208. In another embodiment, first core 202 and second core 204 are hollow cores in the cladding material 208.

The cores 206 are separated on the order of only a few microns to a few tens of microns in distance so that they share nearly identical environments yet do not optically cross-couple. The first core and second core are configured such that any acoustic or thermal disturbances experienced along the optical path of either the first core 202 are experienced similarly by the second core 204.

Furthermore, cores 202 and 204 are produced using the same material (or within the same material in the case of hollow cores), and fabricated at the same time using the same process and parameters. The cores 206 of the transport fiber are configured such that they have almost identical properties for guiding light. Thus, a relative phase between the phase of the CW signal and the phase of the CCW signal are substantially maintained, and phase variations introduced by the transport fiber 200 to the phase of a CW signal and CCW signal are reduced. Similarly, the differential frequency between the frequency of the CW signal and the frequency of the CCW signal is substantially maintained, and frequency variations introduced by the transport fiber 200 are reduced.

Figure 3:
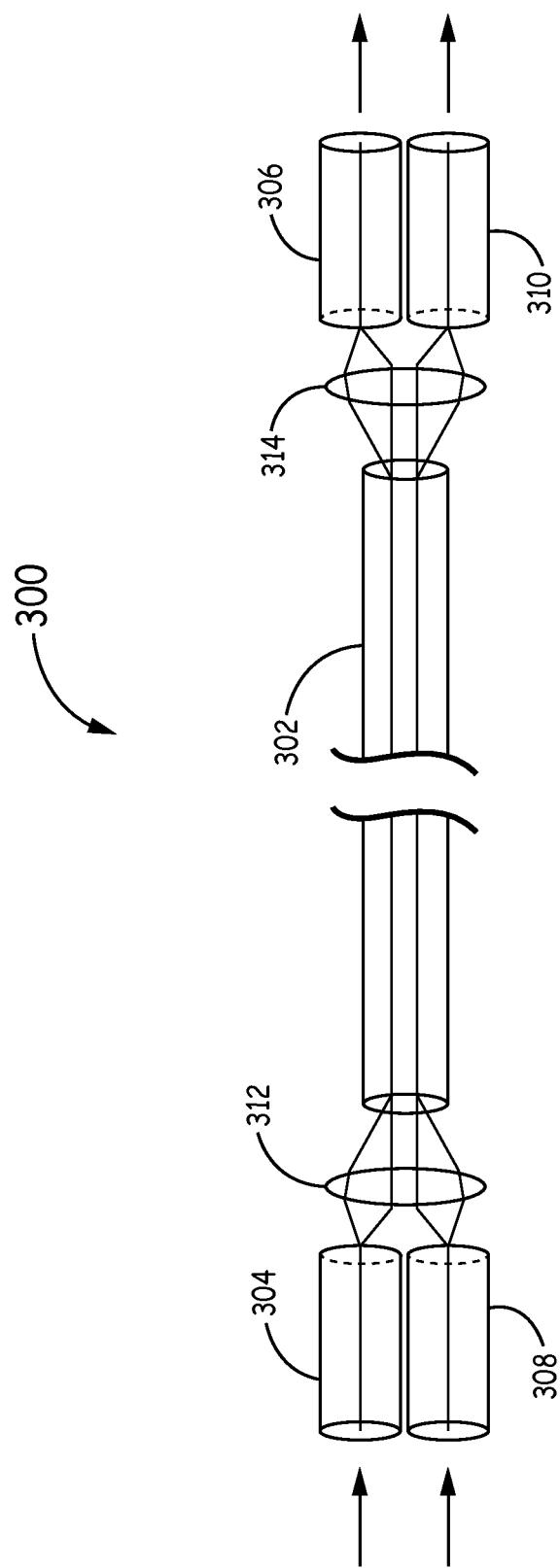
FIG. 3 illustrates one embodiment of an exemplary transport fiber coupled to input fibers and output fibers via micro-optical couplers.

FIG. 3 shows an example of a transport system 300 with a transport fiber 302 coupled to input optical fibers 304 and 308 and output optical fibers 306 and 310 via micro-optical couplers 312 and 314. The input of transport fiber 302 is coupled to a CW input optical fiber 304 and CCW input optical fiber 308 via micro-optic coupler 312. The output of transport fiber 302 is coupled to a CW resonator fiber 306, and CCW resonator fiber 310 via micro-optical coupler 314.

CW input optical fiber 304 is coupled to a CW laser light source configured to generate the CW signal. CW input optical fiber 304 carries the CW signal to a micro-optic coupler 312, which optically couples the CW signal from CW input optical fiber 304 to a first core of the transport fiber 302. CCW input optical fiber 308 is coupled to a CCW laser light source configured to generate the CCW signal. CCW input optical fiber 308 carries the CCW signal to micro-optic coupler 312, which optically couples the CCW signal from CCW input optical fiber 308 to a second core of the transport fiber 302. Micro-optic coupler 312 comprises at least one micro-optical element configured to direct the CW and CCW signals to a corresponding core of the transport fiber 302. Micro-optic elements include, but are not limited to, lenses, mirrors, or a combination of lenses and mirrors. In one embodiment, micro-optic coupler 312 is a single lens configured to optically couple both CW and CCW signal to their respective cores of the transport fiber 302.

Transport fiber 302 transfers the CW signal and CCW signal to a second micro-optic coupler 314. The micro-optic coupler 314 is configured to optically couple the CW signal to CW resonator fiber 306, and CCW signal to CCW resonator fiber 310. Micro-optic coupler 314 comprises at least one micro-optical element configured to direct the CW and CCW signal to the respective resonator fibers 306/310. In one embodiment, micro-optic coupler 314. In one embodiment, the micro-optic coupler 314 is implemented on a silicon optic bench, where the elements of the micro-optic coupler 314 are integrated in an optical chip.

Figure 4:
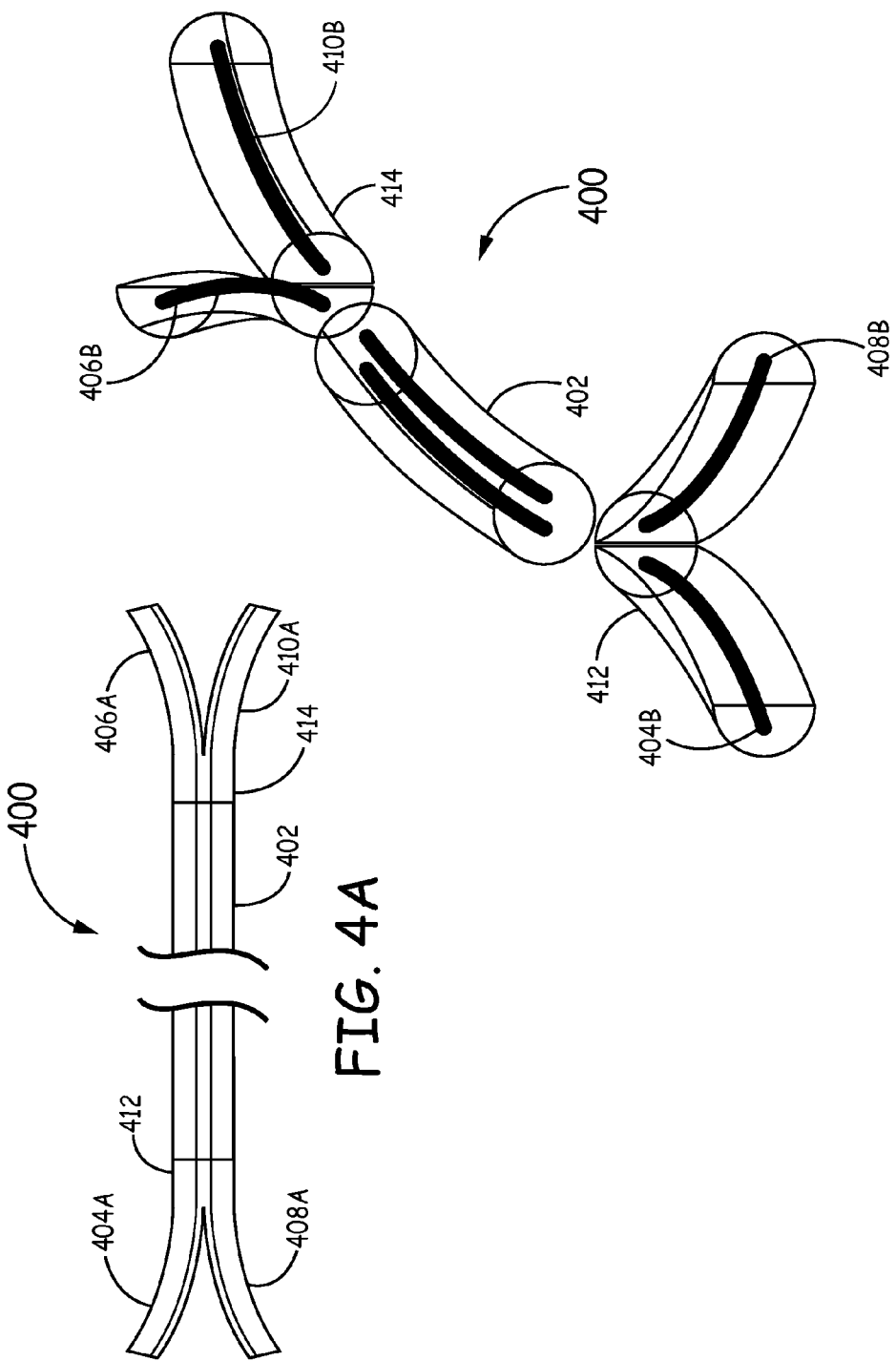
FIG. 4A illustrates one embodiment of an exemplary transport fiber coupled to input fibers and output fibers via all-fiber couplers.
FIG. 4B illustrates an exploded view of an exemplary transport fiber coupled to input fibers and output fibers via all-fiber couplers according to one embodiment.

FIGS. 4A and 4B show an example transport system 400 with a transport fiber 402 with all-fiber couplers 412 and 414. FIG. 4B shows an exploded view of the system 400 including the transport fiber 402 and the cores of each of the all-fiber couplers 412 and 414. The input of transport fiber 402 is coupled to a CW input optical fiber (not shown) and CCW input optical fiber (not shown) via input all-fiber coupler 412. The output of transport fiber 402 is coupled to a resonator CW input optical fiber (not shown), and resonator CCW input optical fiber (not shown) via resonator all-fiber coupler 414. All-fiber couplers 412 and 414 are configured with multiple coupler cores 404B, 408B, 406B, and 410B, so that transport fiber 402 can receive inputs form and transmit to conventional single-core fibers. In one embodiment, the all-fiber couplers 412/414 have a shape and form that resemble optical fibers, but have the ability to be split apart manually forming an adjustable Y-junction. In other embodiments, all-fiber couplers 412/414 are manufactured with a pre-fabricated nonadjustable Y-junction.

Input all-fiber coupler 412 comprises a CW input leg 404A and CCW input leg 408A, the CW input leg 404A having a CW input coupler core 404B, and CCW input leg 408A having CCW input coupler core 408B. In one embodiment, transport fiber 402 has hollow cores, and CW input coupler core 404B and CCW input coupler core 408B are hollow cores corresponding to the hollow cores of transport fiber 402. In other embodiments, CW and CCW input coupler cores 404B and 408B are different from the cores of the transport fiber. CW leg 404A is optically coupled to a CW input optical fiber (not shown), and carries the CW signal to transport fiber 402. CCW leg 408A is optically coupled to a CCW input optical fiber (not shown), and carries the CCW signal to transport fiber 402. The input all-fiber coupler 412 is then optically coupled to the input side of the transport fiber 402 such that CW input coupler core 404B is optically coupled to a CW core of the transport fiber 402, and CCW input coupler core 408B is optically coupled to a CCW core of the transport fiber 402. In one embodiment, the input all-fiber coupler 412 is spliced to transport fiber 402, CW input leg 404A is spliced to a CW input optical fiber by a conventional single-core to single-core optical fiber splice, and CCW input leg 408A is spliced to a CCW input optical fiber by a conventional single-core to single-core optical fiber splice.

Resonator all-fiber coupler 414 comprises a CW output leg 406A and CCW output leg 410A, the CW output leg 406A having a CW output coupler core 404B, and CCW output leg 410A having a CCW output coupler core 410B. Resonator all-fiber coupler 414 is optically coupled to a transport fiber as described above with respect to the input all-fiber coupler 412, such that CW output coupler core 406B is optically coupled to the CW core of the transport fiber 402, and CCW output coupler core 410B is optically coupled to the CCW core of the transport fiber 402. CW output leg 406A is coupled to a resonator CW input optical fiber that carries the CW signal from CW output leg 406A to a CW input of the resonator. CCW output leg 410A is coupled to a resonator CCW input optical fiber that carries the CCW signal from CCW output leg 410A to a CCW input of the resonator.

Figure 5:
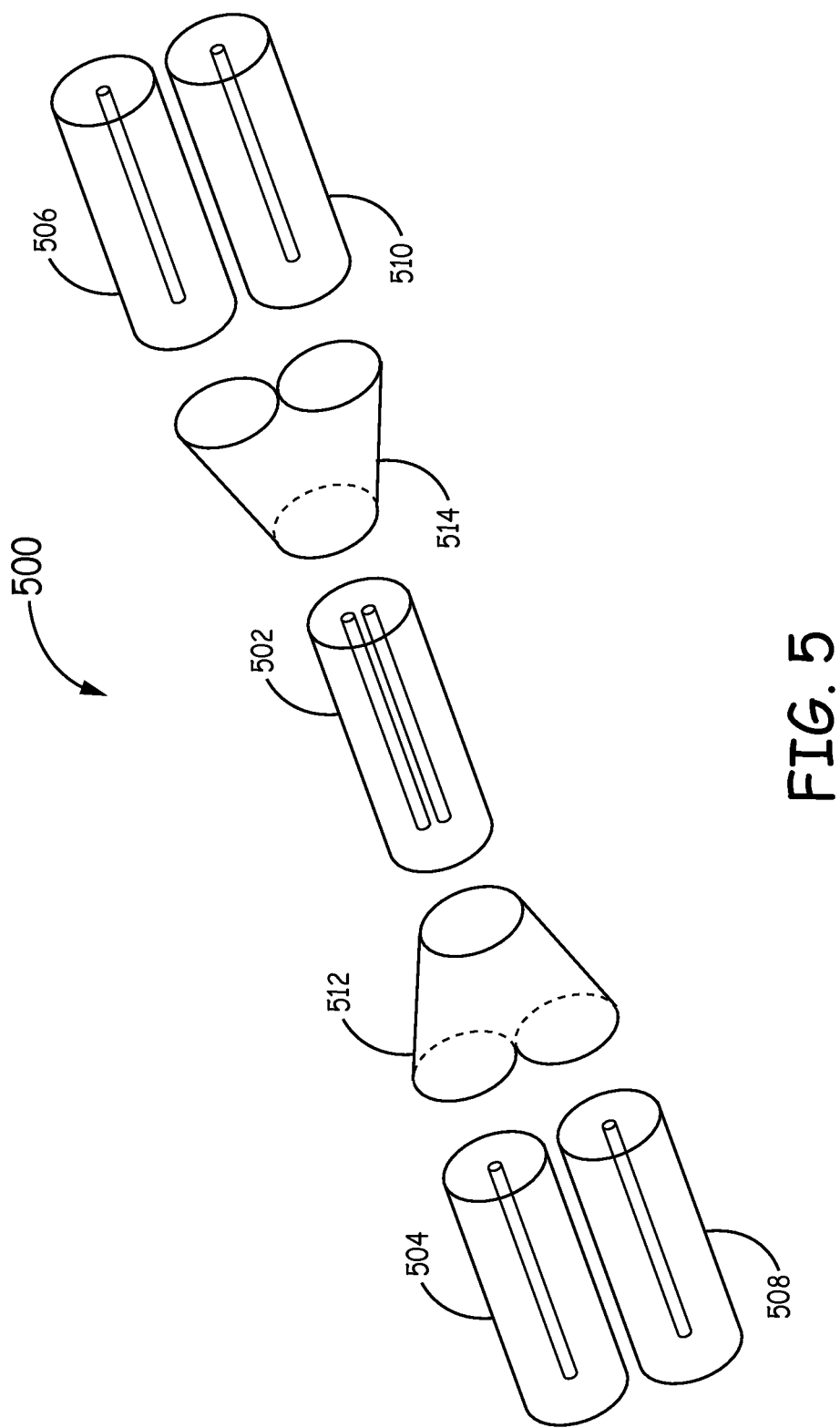
FIG. 5 illustrate an exploded view of exemplary input fibers, a coupler, a transport fiber, a second coupler, and output fibers.

FIG. 5 shows an exploded view of a transport system 500 with a transport fiber 502 with gradient index (GRIN) lens couplers 512 and 514 according to one embodiment. The input of transport fiber 502 is coupled to a CW input optical fiber 504 and CCW input optical fiber 508 via input GRIN lens coupler 512. The output of transport fiber 502 is coupled to a resonator CW input optical fiber 506, and resonator CCW input optical fiber 510 via resonator GRIN lens coupler 514.

GRIN lens couplers 512 and 514 are optical elements having gradually varying refractive index materials configured such that the optical elements act as a lens. In one embodiment, the GRIN lens couplers 512 and 514 have a shape that corresponds to that of transport fiber 502 on one end, and a shape corresponding to optical fibers 504/508 and 506/510 respectively on the other end.

Input GRIN lens coupler 512 is configured to direct the CW signal from CW input optical fiber 504 to the CW core of the transport fiber 502, and the CCW signal from CCW input optical fiber 508 to the CCW core of the transport fiber 502. Resonator GRIN lens coupler 514 is configured to transmit the CW signal from the CW core of the transport fiber 502 to the resonator CW input optical fiber 506, and the CCW signal from the CCW core of the transport fiber 502 to the resonator CCW input optical fiber 510.

Although specific embodiments have been illustrated and described herein, it will be appreciated by those of ordinary skill in the art that any arrangement, which can achieve the same purpose, may be substituted for the specific embodiments shown. Therefore, it is manifestly intended that this invention be limited only by the claims and the equivalents thereof.

EXAMPLE EMBODIMENTS

Example 1 includes a resonant fiber optic gyroscope system comprising: a first laser source configured to generate a clockwise signal having a first phase; a second laser source configured to generate a counterclockwise signal having a second phase; a clockwise input optical fiber optically coupled to the first laser source; a counterclockwise input optical fiber optically coupled to the second laser source; a transport fiber having at least a first core and second core, wherein the first and second cores are configured along the length of the transport fiber to have a proximity such that the phase relationship between the first and second phases is substantially maintained as the clockwise and counterclockwise signals travel through the first and second cores; a first coupler configured to optically couple the clockwise signal from the clockwise input optical fiber to the first core, and the counterclockwise signal from the counterclockwise input optical fiber to the second core; a second coupler configured to optically couple the clockwise signal from the first core to a clockwise resonator fiber, and the counterclockwise signal from the second core to a counterclockwise resonator fiber; a resonator having a clockwise input and a counterclockwise input, the clockwise input coupled to the first clockwise resonator fiber, the counterclockwise input coupled to the counterclockwise resonator fiber.

Example 2 includes the system of example 1, wherein the first laser source and second laser source are coupled to a phase lock loop, wherein the phase lock loop locks the first phase to the second phase.

Example 3 includes the system of any of examples 1-2, wherein the transport fiber is a hollow core fiber, wherein the at least first core and second core are hollow cores.

Example 4 includes the system of any of any of examples 1-2, wherein the transport fiber is a photonic crystal fiber, wherein the at least first core and second core are hollow cores.

Example 5 includes the system of any of examples 1-4, wherein at least one of the first coupler and second coupler are micro-optic couplers, wherein micro-optic couplers include lenses or mirrors.

Example 6 includes the system of example 5, wherein the micro-optic coupler is a single lens configured to direct the clockwise signal from the clockwise input optical fiber to the first core or resonator, and the counterclockwise signal from the counterclockwise input optical fiber to the second core or resonator.

Example 7 includes the system of any of examples 5-6, wherein the micro-optic coupler is implemented on a silicon optical bench.

Example 8 includes the system of any of examples 1-4, wherein at least one of the first coupler and second coupler are a gradient index lens.

Example 9 includes the system of any of examples 1-4, wherein the first coupler and second coupler are all-fiber couplers, wherein the all-fiber couplers comprise a first coupler core and a second coupler core, the first coupler core having one end spliced to the first core, and a remaining end spliced to the clockwise input optical fiber or resonator, the second coupler core having one end spliced to the second core, and a remaining end spliced to the counterclockwise input optical fiber or resonator.

Example 10 includes a multi-core transport system for a resonant fiber optic gyroscope, the transport system comprising: transport fiber configured to transmit a clockwise signal and a counterclockwise signal, wherein the transport fiber has at least a first core and a second core, wherein the first core and second core are configured such that when the first core imparts a first effect on the clockwise signal, the second core imparts a second effect on the counterclockwise signal, wherein the second effect substantially mirrors the first effect; a first coupler configured to optically couple the clockwise signal to the first core, and the counterclockwise signal to the second core; and a second coupler configured to optically couple the clockwise signal from the first core to a resonator, and the counterclockwise signal from the second core to the resonator.

Example 11 includes the system of examples 10, wherein the first and second effects include at least one of a frequency change in the clockwise or counterclockwise signal, a phase change in the clockwise or counterclockwise signal, acoustic noise, and thermal noise.

Example 12 includes the system of any of examples 10-11, wherein the at least first core and second core are hollow cores.

Example 13 includes the system of any of examples 10-12, wherein at least one of the first coupler and second coupler are micro-optic couplers, wherein micro-optic couplers include lenses or mirrors.

Example 14 includes the system of example 13, wherein the micro-optic coupler is a single lens configured to direct the clockwise signal from the clockwise input optical fiber to the first core or resonator, and the counterclockwise signal from the counterclockwise input optical fiber to the second core or resonator.

Example 15 includes the system of any of examples 10-12, wherein at least one of the first coupler or second coupler is a gradient index lens.

Example 16 includes the system of any of examples 10-12, wherein the first coupler and second coupler are all-fiber couplers, wherein the all-fiber couplers comprise a first coupler core and a second coupler core, the first coupler core having one end spliced to the first core, and a remaining end spliced to the clockwise input optical fiber or resonator, the second coupler core having one end spliced to the second core, and a remaining end spliced to the counterclockwise input optical fiber or resonator.

Example 17 includes a method for transporting clockwise and counterclockwise signals in a resonant fiber optic gyroscope, the method comprising: receiving a clockwise signal having a first frequency and a first phase, receiving a counterclockwise signal having a second frequency and a second phase; transporting the clockwise signal in a first core of a transport fiber; transporting the counterclockwise signal via a second core of the transport fiber at a proximity to the first core such that a differential phase is substantially maintained, wherein the differential phase is a relative difference between the first phase and the second phase; and optically coupling the clockwise signal and counterclockwise signal to a resonator of the fiber optic gyroscope.

Example 18 includes the method of example 17, wherein receiving a clockwise signal and a counterclockwise signal comprises: receiving a clockwise signal and a counterclockwise signal via at least one of a micro-optic coupler, a gradient index lens, or an all-fiber coupler.

Example 19 includes the method of any of examples 17-18, wherein transporting the counterclockwise signal via the second core of the transport fiber further comprises: transporting the counterclockwise signal via the second core of the transport fiber at a proximity to the first core such that a differential frequency is substantially maintained, wherein the differential frequency is a relative difference between a first frequency of the clockwise signal and a second frequency of the counterclockwise signal.

Example 20 includes the method of any of examples 17-19, wherein transporting the counterclockwise signal via the second core of the transport fiber further comprises: transporting the counterclockwise signal via the second core of the transport fiber at a proximity to the first core such that acoustic and thermal disturbances are substantially identical along the first and second cores.

What is claimed is:

1. A resonant fiber optic gyroscope system comprising:
   a first laser source configured to generate a clockwise signal having a first phase;
   a second laser source configured to generate a counterclockwise signal having a second phase;
   a clockwise input optical fiber optically coupled to the first laser source;
   a counterclockwise input optical fiber optically coupled to the second laser source;
   a transport fiber having at least a first core and second core, wherein the first and second cores are configured along the length of the transport fiber to have a proximity such that the phase relationship between the first and second phases is substantially maintained as the clockwise and counterclockwise signals travel through the first and second cores;
   a first coupler configured to optically couple the clockwise signal from the clockwise input optical fiber to the first core, and the counterclockwise signal from the counterclockwise input optical fiber to the second core;
   a second coupler configured to optically couple the clockwise signal from the first core to a clockwise resonator fiber, and the counterclockwise signal from the second core to a counterclockwise resonator fiber;
   a resonator having a clockwise input and a counterclockwise input, the clockwise input coupled to the first clockwise resonator fiber, the counterclockwise input coupled to the counterclockwise resonator fiber.

2. The system of claim 1, wherein the first laser source and second laser source are coupled to a phase lock loop, wherein the phase lock loop locks the first phase to the second phase.

3. The system of claim 1, wherein the transport fiber is a hollow core fiber, wherein the at least first core and second core are hollow cores.

4. The system of claim 1, wherein the transport fiber is a photonic crystal fiber, wherein the at least first core and second core are hollow cores.

5. The system of claim 1, wherein at least one of the first coupler and second coupler are micro-optic couplers, wherein micro-optic couplers include lenses or mirrors.

6. The system of claim 5, wherein the micro-optic coupler is a single lens configured to direct the clockwise signal from the clockwise input optical fiber to the first core or resonator, and the counterclockwise signal from the counterclockwise input optical fiber to the second core or resonator.

7. The system of claim 5, wherein the micro-optic coupler is implemented on a silicon optical bench.

8. The system of claim 1, wherein at least one of the first coupler and second coupler are a gradient index lens.

9. The system of claim 1, wherein the first coupler and second coupler are all-fiber couplers, wherein the all-fiber couplers comprise a first coupler core and a second coupler core, the first coupler core having one end spliced to the first core, and a remaining end spliced to the clockwise input optical fiber or resonator, the second coupler core having one end spliced to the second core, and a remaining end spliced to the counterclockwise input optical fiber or resonator.

10. A method for transporting clockwise and counterclockwise signals in a resonant fiber optic gyroscope, the method comprising:
    receiving a clockwise signal having a first frequency and a first phase,
    receiving a counterclockwise signal having a second frequency and a second phase;
    transporting the clockwise signal in a first core of a transport fiber;
    transporting the counterclockwise signal via a second core of the transport fiber at a proximity to the first core such that a differential phase is substantially maintained, wherein the differential phase is a relative difference between the first phase and the second phase; and
    optically coupling the clockwise signal and counterclockwise signal to a resonator of the fiber optic gyroscope.

11. The method of claim 10, wherein receiving a clockwise signal and a counterclockwise signal comprises:
   receiving a clockwise signal and a counterclockwise signal via at least one of a micro-optic coupler, a gradient index lens, or an all-fiber coupler.

12. The method of claim 10, wherein transporting the counterclockwise signal via the second core of the transport fiber further comprises:
   transporting the counterclockwise signal via the second core of the transport fiber at a proximity to the first core such that a differential frequency is substantially maintained, wherein the differential frequency is a relative difference between a first frequency of the clockwise signal and a second frequency of the counterclockwise signal.

13. The method of claim 10, wherein transporting the counterclockwise signal via the second core of the transport fiber further comprises:
   transporting the counterclockwise signal via the second core of the transport fiber at a proximity to the first core such that acoustic and thermal disturbances are substantially identical along the first and second cores.

* * * * *